(12) United States Patent
Mally

(10) Patent No.: US 8,337,975 B2
(45) Date of Patent: Dec. 25, 2012

(54) VEHICLE PANEL

(75) Inventor: Thomas Mally, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 980 days.

(21) Appl. No.: 12/356,848

(22) Filed: Jan. 21, 2009

(65) Prior Publication Data

US 2010/0183841 A1    Jul. 22, 2010

(51) Int. Cl.
*B32B 3/24* (2006.01)
(52) U.S. Cl. .................................. 428/140; 428/139
(58) Field of Classification Search .................. 428/139, 428/140
See application file for complete search history.

(56) References Cited

U.S. PATENT DOCUMENTS

| | | | |
|---|---|---|---|
| 5,817,408 A | 10/1998 | Orimo et al. | |
| 5,922,265 A | 7/1999 | Parekh | |
| 6,268,037 B1 * | 7/2001 | Butler et al. | 428/100 |
| 6,403,195 B1 * | 6/2002 | Montagna et al. | 428/71 |
| 7,070,848 B2 | 7/2006 | Campbell | |
| 7,291,378 B2 * | 11/2007 | Cowelchuk et al. | 428/140 |
| 2005/0126848 A1 | 6/2005 | Siavoshai et al. | |

* cited by examiner

*Primary Examiner* — William P Watkins, III
(74) *Attorney, Agent, or Firm* — Global IP Counselors, LLP

(57) ABSTRACT

A vehicle panel basically includes a skin layer, a substrate layer and a foam material. The skin layer includes an inbound facing side and an outbound facing side. The substrate layer includes an inbound facing side and an outbound facing side, with the inbound facing side of the substrate layer overlying and spaced from the outbound facing side of the skin layer to form a space therebetween. The foam material includes a first foam layer disposed in the space between the skin layer and the substrate layer and a second foam layer overlying the outbound facing side of the substrate layer, with the first and second foam layers being interconnected as a unitary member through at least one opening in the substrate layer.

9 Claims, 8 Drawing Sheets

VEHICLE PANEL

BACKGROUND OF THE INVENTION

1. Field of the Invention

The present invention generally relates to a vehicle panel. More specifically, the present invention relates to a vehicle panel that is configured to deal with NVH (Noise, Vibration and Harshness) from penetrating into a vehicle cabin.

2. Background Information

In most vehicles with cabins, it is desirable to keep engine and other outside noises from disturbing passengers in the motor vehicle. Typically, a vehicle has a dashboard (vehicle panel) that partially defines an interior portion of a vehicle's cabin. The dashboard is often constructed in such a manner as to suppress noises and vibrations from disturbing passengers in the motor vehicle. For example, some conventional dashboards are provided with a layer of foam between an interior skin layer and a substrate layer. Under the substrate, a dashmat (e.g., a cotton shoddy) is sometimes attached by mechanical fasteners adhesive. The cotton shoddy is typically attached to the substrate layer of the dashboard after the layer of foam is injected between the interior skin layer and the substrate layer. One example of a dashmat for blocking sound from entering the passenger cabin is disclosed in U.S. Patent Application Publication No. 2005/0126848.

Other attempts have been made to block out sound from the passenger cabin. For example, in U.S. Pat. No. 5,817,408, an acoustic barrier or a sound insulation structure has been proposed for a passenger cabin in which two foam densities are used to block out sound from the passenger cabin. Each foam density blocks different frequencies of noise. Another example, of an acoustic barrier or a sound insulation structure for a passenger cabin has been proposed U.S. Pat. No. 5,922,265 in which melted foam is applied to body panels in the desired locations. Also U.S. Pat. No. 7,070,848 discloses an acoustic barrier in the form of a fibrous mat or foam material that is attached to body panels using a plurality of mechanical fasteners to block sound from entering the passenger cabin.

In view of the above, it will be apparent to those skilled in the art from this disclosure that there exists a need for an improved vehicle panel. This invention addresses this need in the art as well as other needs, which will become apparent to those skilled in the art from this disclosure.

SUMMARY OF THE INVENTION

It has been discovered that in the proposed sound insulation structures, mentioned above, an additional manufacturing step is needed to install the insulation material to the vehicle panel. In view of the state of the known technology, one object of the present invention is to provide a vehicle panel that can incorporate forming an insulation layer without adding a special manufacturing step just for forming the insulation layer.

In view of the above, a vehicle panel is provided in accordance with one aspect in which the vehicle panel basically comprises a skin layer, a substrate layer and a foam material. The skin layer includes an inbound facing side and an outbound facing side. The substrate layer includes an inbound facing side and an outbound facing side, with the inbound facing side of the substrate layer overlying and spaced from the outbound facing side of the skin layer to form a space therebetween. The foam material includes a first foam layer disposed in the space between the skin layer and the substrate layer and a second foam layer overlying the outbound facing side of the substrate layer, with the first and second foam layers being interconnected as a unitary member through at least one opening in the substrate layer.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
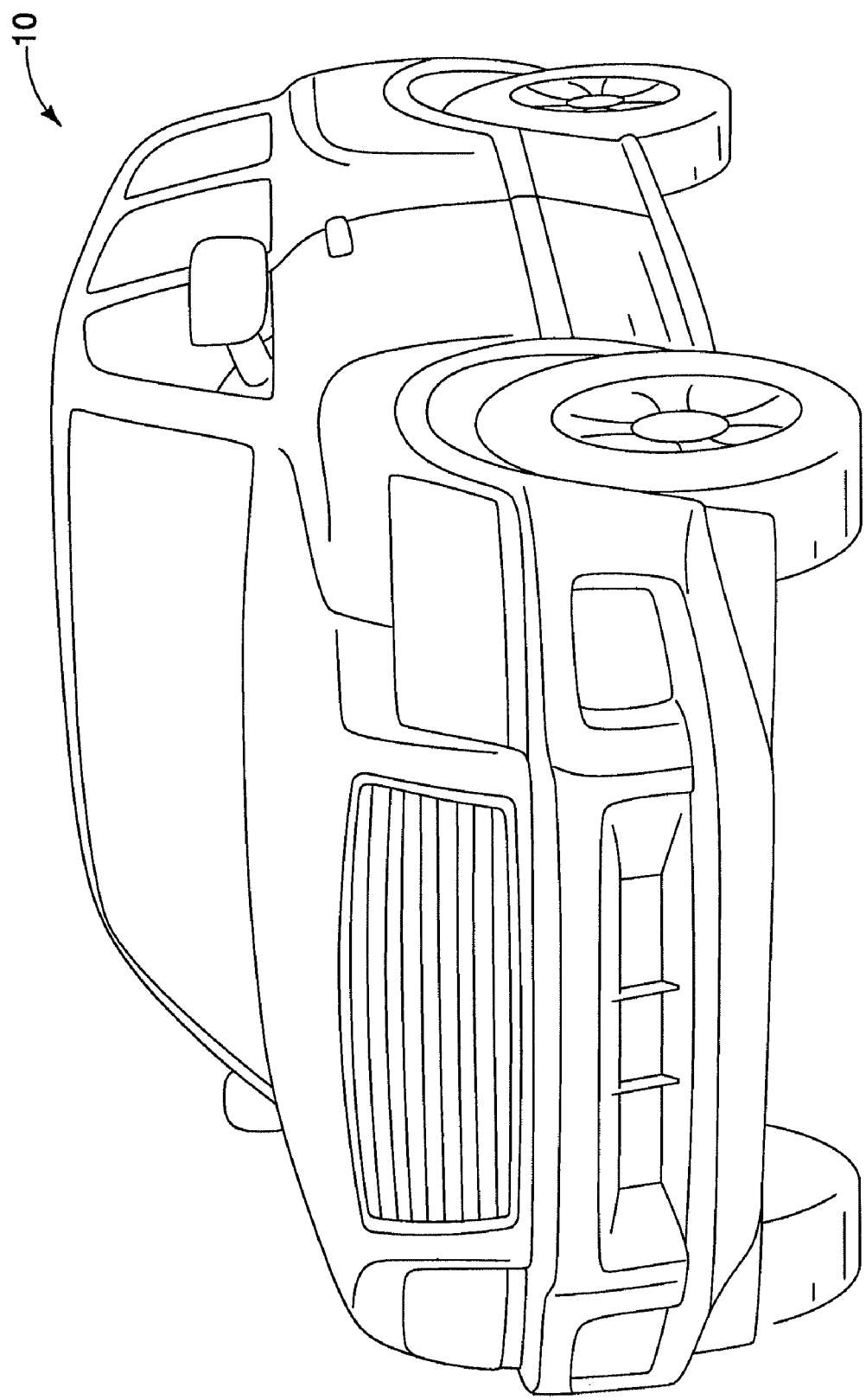
FIG. 1 is a perspective view of a vehicle that includes a vehicle panel in accordance with one illustrated embodiment.
Figure 2:
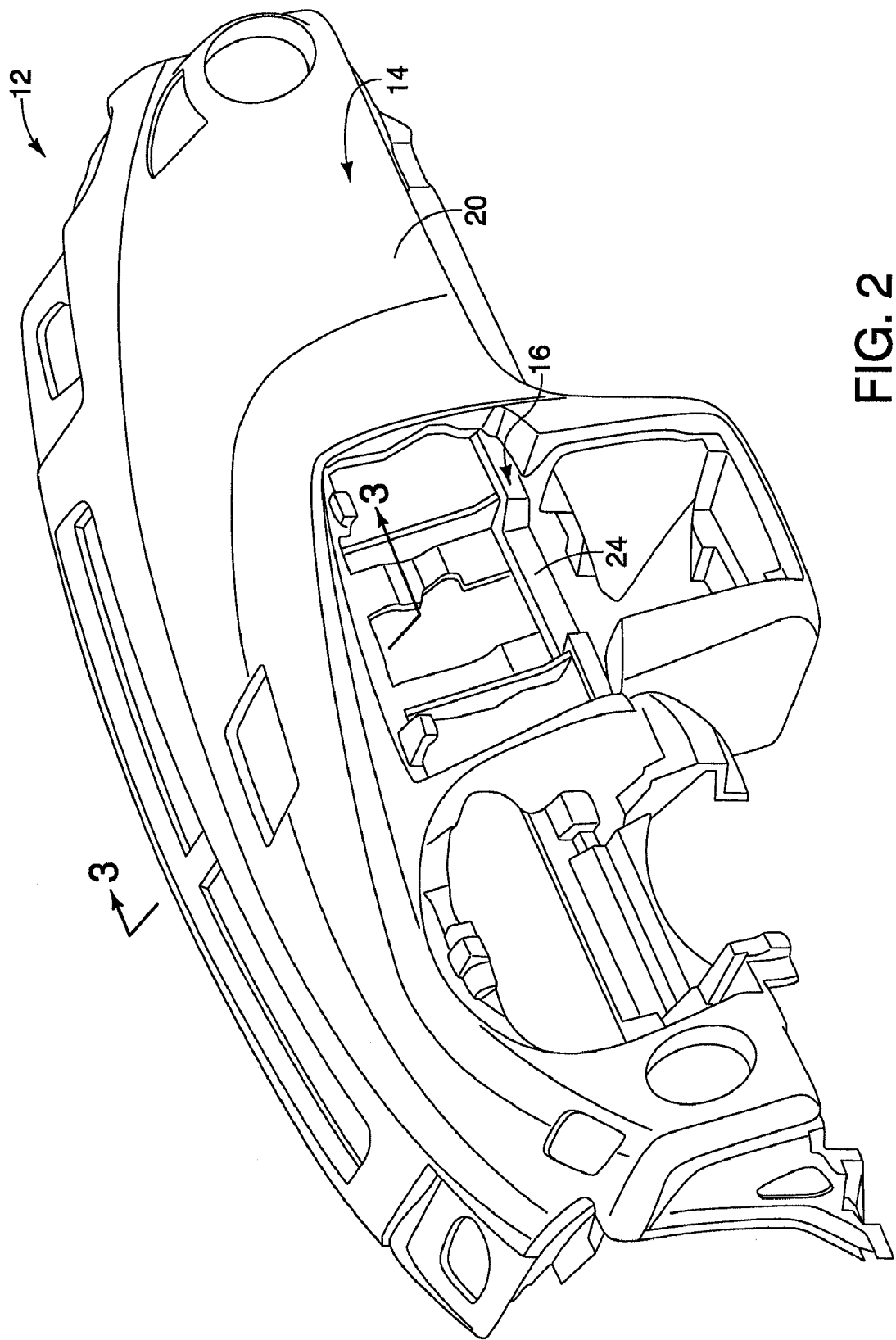
FIG. 2 is a perspective view of the vehicle panel in accordance with one illustrated embodiment.

Referring initially to FIGS. 1 and 2, a vehicle 10 is illustrated that includes a vehicle panel 12 in accordance with a one embodiment. In the illustrated embodiment, the vehicle panel 12 is a dashboard panel for a passenger cabin of the vehicle 10. The vehicle panel 12 forms an acoustic barrier or a sound insulation structure for the passenger cabin. Basically, the vehicle panel 12 includes a skin layer 14, a substrate layer 16 and a foam material 18. As explained below, the foam material 18 is disposed between the skin layer 14 and the substrate layer 16 to support the skin layer 14 on the substrate layer 16. The foam material 18 is also disposed on the other side of the substrate layer 16 that faces away from the skin layer 14. Thus, the foam material 18 blocks sound from entering the passenger cabin of the vehicle 10.

Figure 3:
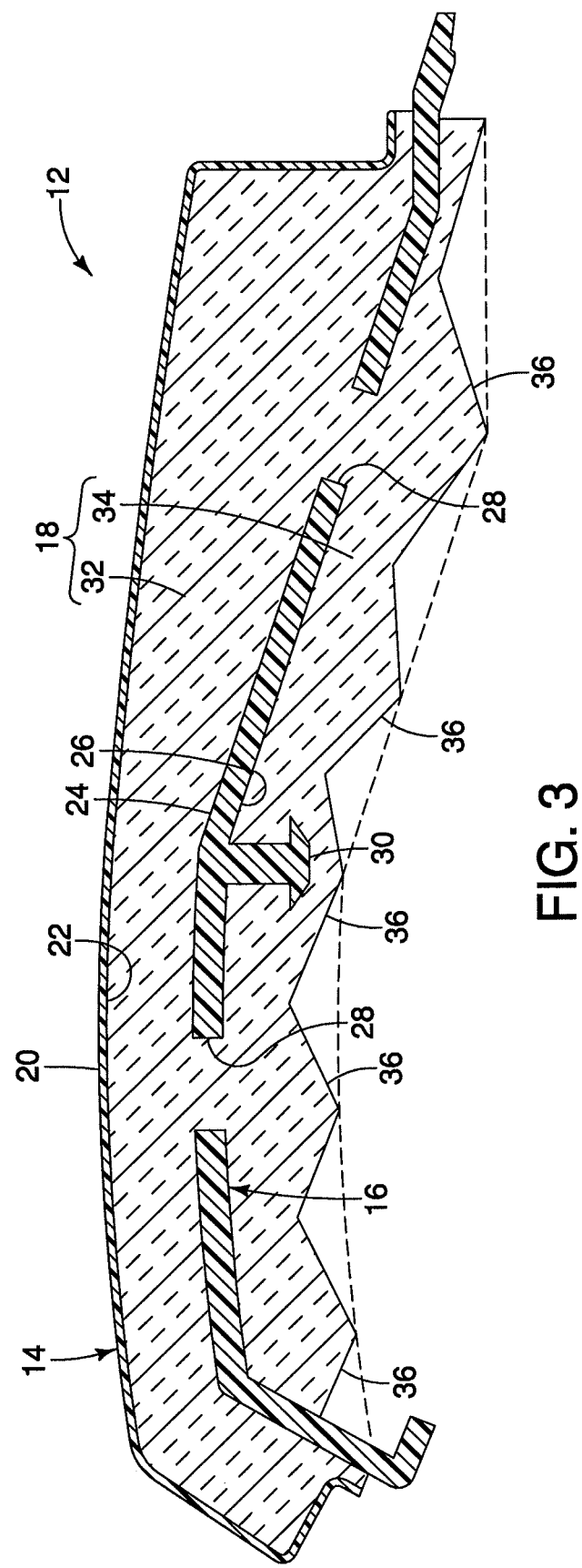
FIG. 3 is a simplified cross-sectional view of a part of the vehicle panel as seen along section line 3-3 in FIG. 2.

Referring to FIGS. 2 and 3, skin layer 14 includes an inbound facing side 20 and an outbound facing side 22. Preferably, the skin layer 14 is a one-piece, unitary member formed of thin flexible sheet material. The material of the skin layer 14 is preferably a material that is flexible in a wide range of temperatures, that has a high degree of resistance to wear, and that is resistance to buckling and tearing. For example, the skin layer 14 is formed of a thermoplastic polyurethane elastomer that is often used for the skin of a dashboard. The skin layer 14 includes an inbound facing side 20 and an outbound facing side 22. The inbound facing side 20 of the skin layer 14 forms the interior cabin surface of the vehicle panel 12. Thus, the inbound facing side 20 of the skin layer 14 is exposed to the passenger(s) in the passenger cabin of the vehicle 10.

Referring to FIGS. 3 to 7, preferably, the substrate layer 16 is formed of a hard, rigid polypropylene. Of course, it will be apparent to those skilled in the art that the material of the substrate layer 16 can be constructed of other suitable materials such as plastic, fiberglass, or related synthetic materials. In the illustrated embodiment, the substrate layer 16 is a one-piece, unitary member that is injection molded. The substrate layer 16 includes an inbound facing side 24 and an outbound facing side 26, with the inbound facing side 24 of the substrate layer 16 overlying and spaced from the outbound facing side 22 of the skin layer 14 to form a space therebetween. The substrate layer 16 is provided with a plurality of pass through openings 28 in the substrate layer 16 for the foam material 18 to flow through during the manufacturing process of the vehicle panel 12.

Preferably, the outbound facing side 26 of the substrate layer 16 includes a plurality of retaining members 30. The retaining members are integrally formed with the rest of the substrate layer 16 as a one-piece member. The retaining members 30 protrude outwardly from the outbound facing side 26 of the substrate layer 16. The retaining members 30 are embedded in the foam material 18 to hold the foam material 18 on the outbound facing side 26 of the substrate layer 16. The retaining members 30 are illustrated as T-shaped members such that the free end of the retaining members 30 constitutes a barbed portion for holding the foam material 18 on the outbound facing side 26 of the substrate layer 16.

Of course, it will be apparent to those skilled in the art from this disclosure that the retaining members 30 can have other suitable shapes such as a mushroom-shaped to hold the foam material 18 to the outbound facing side 26 of the substrate layer 16. The pattern and spacing of the retaining members 30 depends on various factors such as the shape and size of the vehicle panel 12, the shape of the retaining members 30, and/or the material of the foam material 18. Thus, pattern and spacing of the retaining members 30 will depend upon the particular application.

In the illustrated embodiment, as seen in FIG. 3, the foam material 18 is a one-piece, unitary member that is injection molded to form a first foam layer 32 and a second foam layer 34. The first foam layer 32 is disposed in the space between the skin layer 14 and the substrate layer 16. The second foam layer 34 overlies the outbound facing side 26 of the substrate layer 16. The first and second foam layers 32 and 34 are interconnected as a unitary member through the openings 28 in the substrate layer 16.

The foam material 18 is preferably a low density rigid foam that is used for thermal insulation such as a polyurethane foam. Preferably, the foam material 18 is injected between the skin layer 14 and the substrate layer 16 so that the foam material 18 fills the space between the skin layer 14 and the substrate layer 16 and flows through the openings 28 in the substrate layer 16 so that the foam material 18 at least partially overlie the outbound facing side 26 of the substrate layer 16. Of course, it will be apparent to those skilled in the art from this disclosure that the foam material 18 can be made of other suitable materials that can be injection molded to form the first and second foam layers 32 and 34, which are interconnected as a unitary member through the openings 28 in the substrate layer 16.

Figure 4:
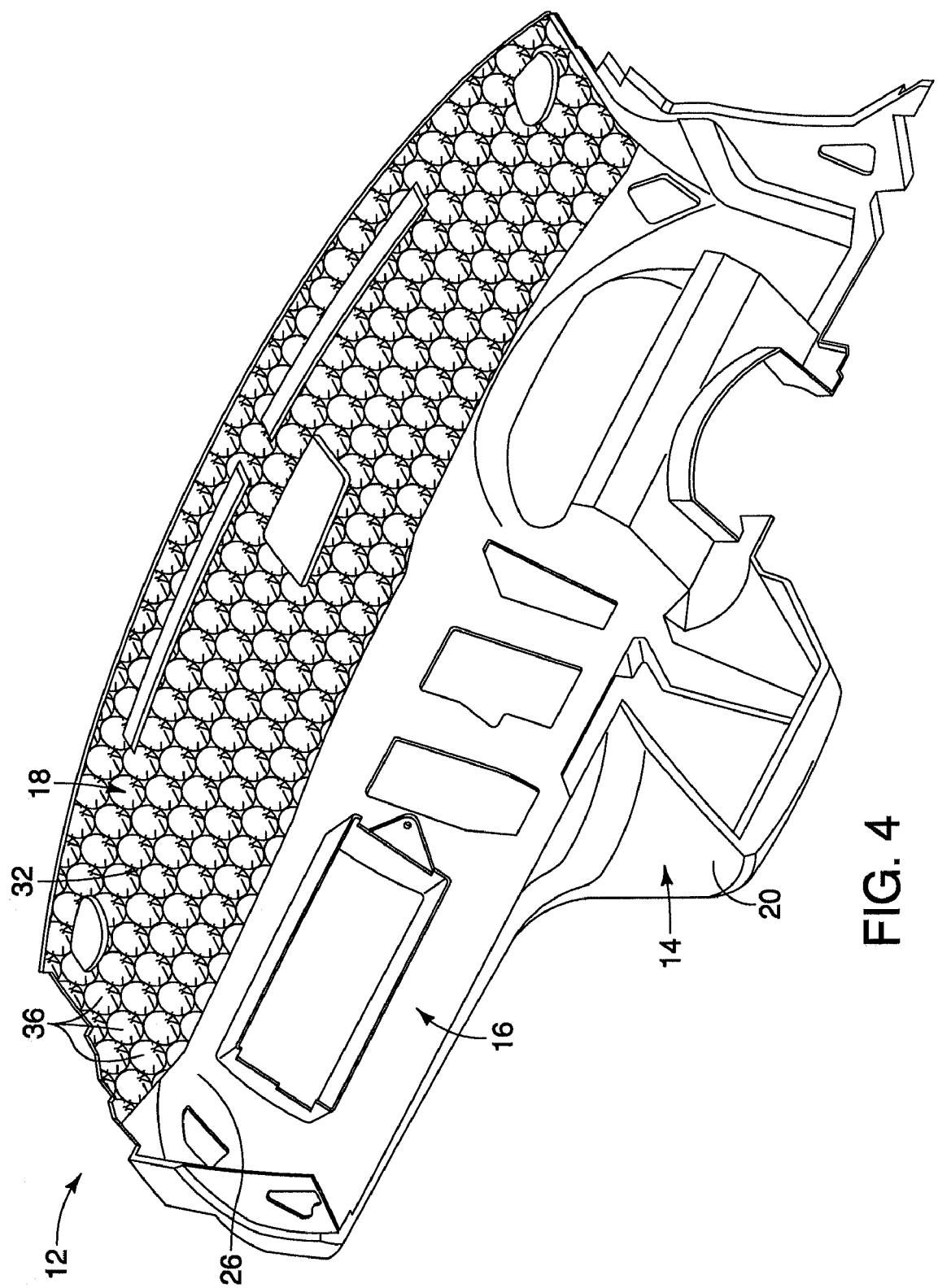
FIG. 4 is a perspective view of the outbound side of the vehicle panel illustrated in FIG. 2.
Figure 5:
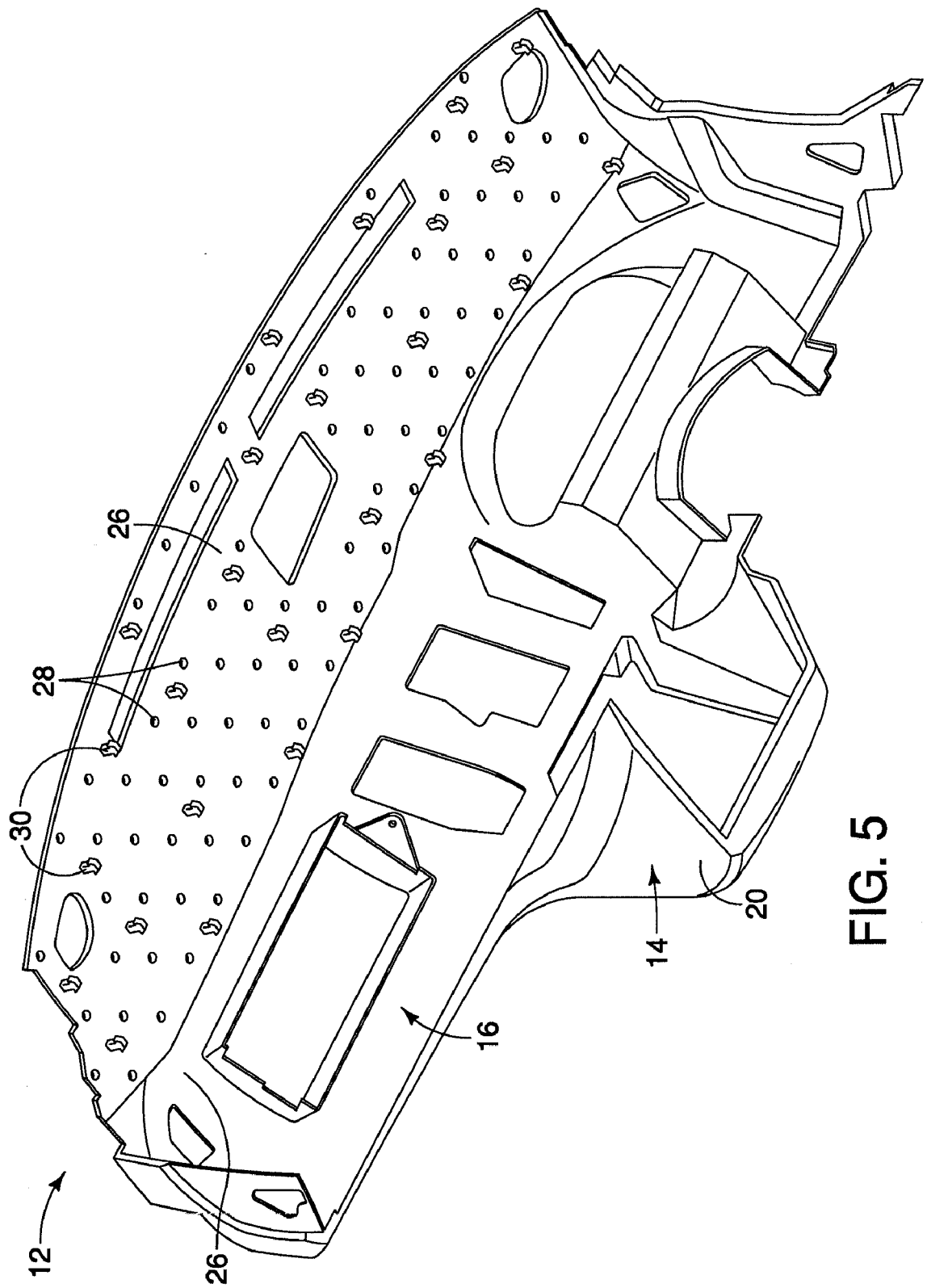
FIG. 5 is a perspective view of the outbound side of the vehicle panel illustrated in FIG. 2, but with the foam material removed from the outbound side of the vehicle panel.
Figure 6:
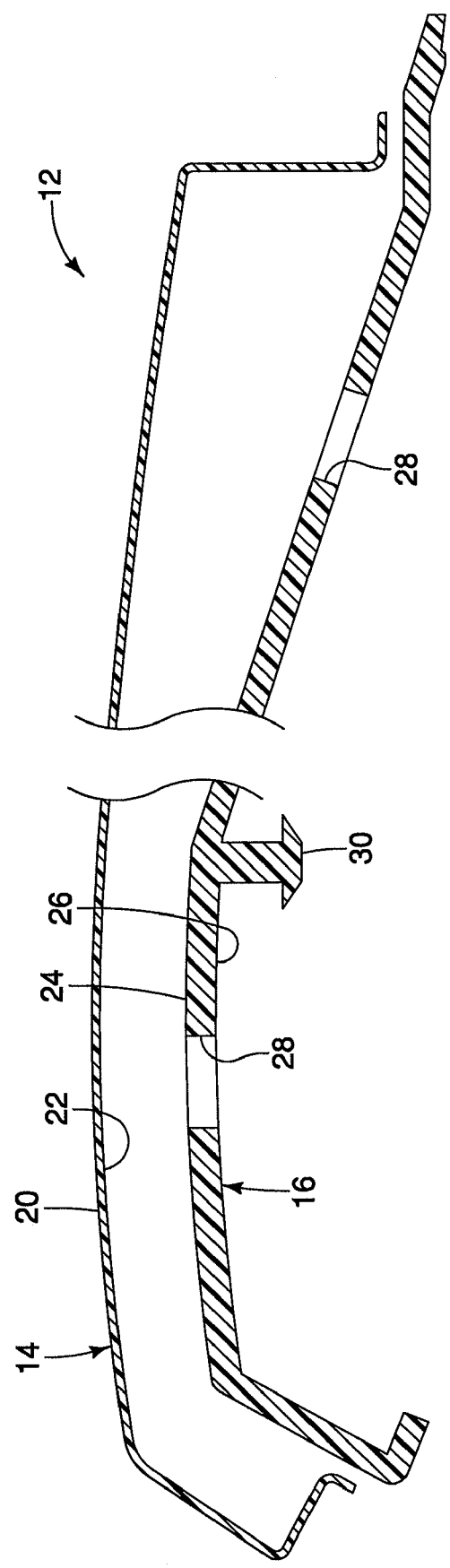
FIG. 6 is a simplified cross-sectional view, similar to FIG. 3, of a part of the vehicle panel, but with the foam material removed.
Figure 7:
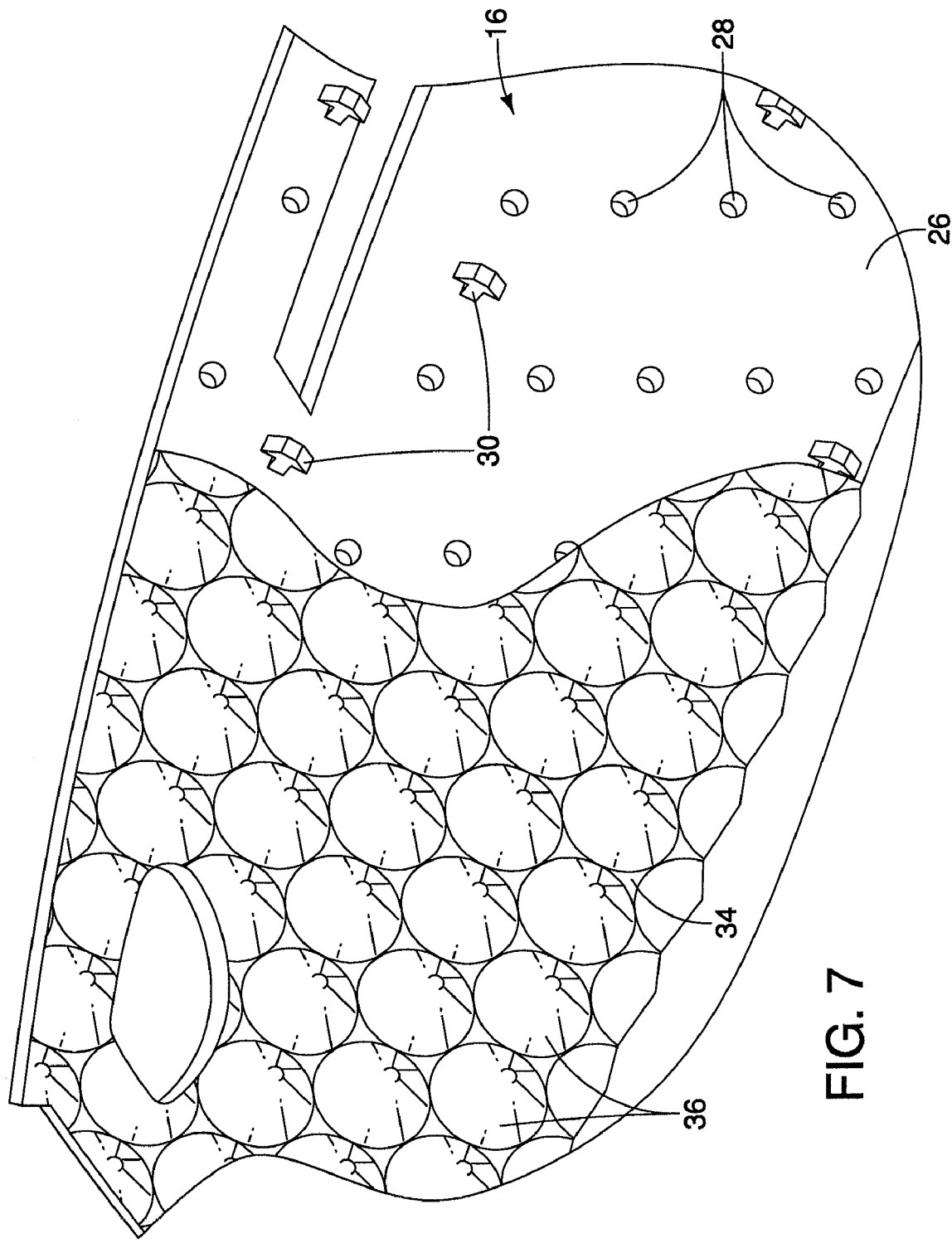
FIG. 7 is an enlarged perspective view of a part of the outbound side of the vehicle panel with a portion of the foam material removed from the outbound side of the vehicle panel.

As seen in FIGS. 3, 4 and 7, the second foam layer 34 has an exposed surface that faces away from the outbound facing side 26 of the substrate layer 16, with the exposed surface including a plurality of projections 36. In the illustrated embodiment, the projections 36 of the exposed surface of the second foam layer 34 are generally cone-shaped members. Of course, it will be apparent to those skilled in the art from this disclosure that the projections 36 can be other shapes such as pyramidal to maximize the amount of surface available for noise reduction performance. In other words, the exposed surface of the second foam layer 34 is contoured (non-flat) to maximize the amount of surface available for noise reduction performance. Preferably, the retaining members 30 are aligned with the projections 36 such that the retaining members 30 extend into the projections 36. In other words, the each of the retaining members 30 is embedded in one of the projections 36 of the second foam layer 34. However, the number of the retaining members 30 can less than the number of the projections 36 as needed and/or desired. Alternatively, the number of the retaining members 30 can be equal to the number of the projections 36 so that each of the projections 36 includes one of the retaining members 30.

Figure 8:
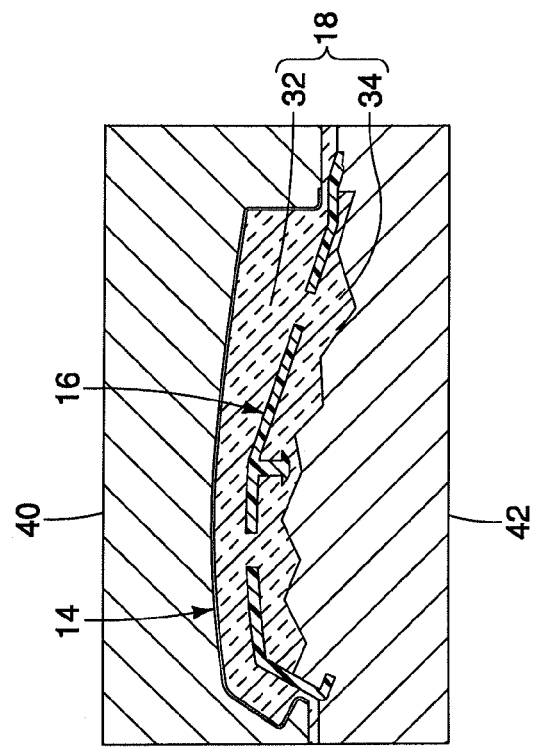
FIG. 8 is a simplified process diagram showing the formation of the vehicle panel.
Figure 8:
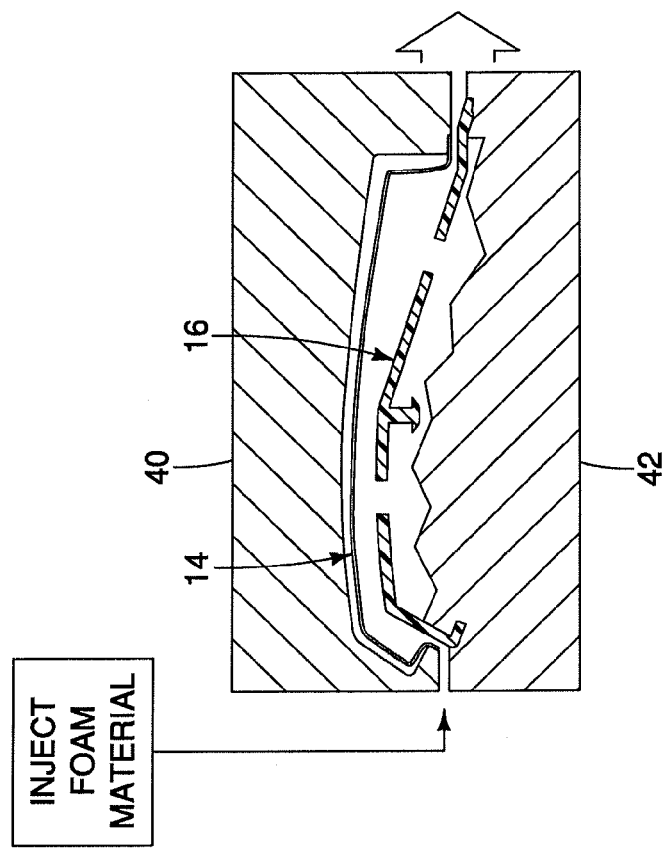

Referring now to FIG. 8, in manufacturing the vehicle panel 12 of the illustrated embodiment, a molding apparatus for manufacturing a dashboard panel includes an upper mold member 40 and a lower mold member 42. The molding apparatus for manufacturing a dashboard panel are well known in the field, and thus, it will not be discussed and/or illustrated herein. Generally speaking, the upper mold member 40 has a mold surface that corresponds to the final shape of the interior surface of the dashboard panel, while the lower mold member 42 has a mold surface that corresponds to the final shape of the projections 36 of the exposed surface of the second foam layer 34 and contacts the portions of the outbound facing side 26 of the substrate layer 16 where the second foam layer 34 is absent.

As seen in the first half of FIG. 8, the skin layer 14 and the substrate layer 16 are placed between the upper and lower mold members 40 and 42. The skin layer 14 is initially not contacting the upper mold member 40, until the foam material 18. Once the foam material 18 is injected between the skin layer 14 and the substrate layer 16, the skin layer 14 is pressed against the upper mold member 40. Then, when the foam material 18 hardens, the skin layer 14 retains the desired shape of the upper mold member 40. As the foam material 18 fills the space between the skin layer 14 and the substrate layer 16 to form the first foam layer 32, and the foam material 18 also flows through the openings 28 in the substrate layer 16 so that the foam material 18 at least partially overlie the outbound facing side 26 of the substrate layer 16 to form the second foam layer 34. In this way, a single foam injection step is performed to simultaneously form both the first and second foam layers 32 and 34 as seen in the second half of FIG. 8.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "inbound facing side", "outbound facing side", "forward", "rearward", "above", "downward", "vertical", "horizontal", "below" and "transverse" as well as any other similar directional terms refer to those directions of a vehicle equipped with the vehicle panel as discussed herein. Accordingly, these terms, as utilized to describe the present invention should be interpreted relative to a vehicle equipped with the vehicle panel as discussed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Thus, the foregoing descriptions of the embodiments according to the present invention are provided for illustration only, and not for the purpose of limiting the invention as defined by the appended claims and their equivalents.

What is claimed is:

1. A vehicle panel comprising:
   a skin layer including an inbound facing side and an outbound facing side;
   a substrate layer including an inbound facing side and an outbound facing side, with the inbound facing side of the substrate layer overlying and spaced from the outbound facing side of the skin layer to form a space therebetween; and
   a foam material including a first foam layer disposed in the space between the skin layer and the substrate layer and a second foam layer overlying the outbound facing side of the substrate layer as a unitary member over a plurality of openings in the substrate layer, with the first and second foam layers being interconnected as a unitary member through the plurality of openings in the substrate layer, and the second foam layer having an exposed surface that faces away from the outbound facing side of the substrate layer and defines an outbound facing surface of the vehicle panel.

2. The vehicle panel according to claim 1, wherein the outbound facing side of the substrate layer includes at least one retaining member protruding outwardly from the outbound facing side of the substrate layer and being embedded in the second foam layer.

3. The vehicle panel according to claim 2, wherein the at least one retaining member includes a plurality of retaining members of protruding outwardly from the outbound facing side of the substrate layer and being embedded in the second foam layer.

4. The vehicle panel according to claim 2, wherein the substrate layer and the at least one retaining member are integrally formed as a one-piece member.

5. The vehicle panel according to claim 2, wherein the at least one retaining member includes a barbed portion.

6. The vehicle panel according to claim 1, wherein the exposed surface includes a plurality of projections.

7. The vehicle panel according to claim 6, wherein the projections of the exposed surface are generally cone-shaped members.

8. The vehicle panel according to claim 6, wherein the outbound facing side of the substrate layer includes a plurality of retaining members protruding outwardly from the outbound facing side of the substrate layer with each of the retaining members being embedded in one of the projections of the second foam layer.

9. The vehicle panel according to claim 6, wherein at least one of the projections of the exposed surface is positioned entirely over a portion of the substrate layer without one of the openings therein.

* * * * *